Patented Mar. 21, 1950

2,501,269

UNITED STATES PATENT OFFICE 2,501,269

FROTH FLOTATION OF SULFIDE ORES

Arthur H. Fischer, New York, N. Y., assignor to Minerec Corporation, New York, N. Y.

No Drawing. Application June 26, 1946,
Serial No. 679,565

5 Claims. (Cl. 209—166)

This invention relates to the concentration of ores and has for an object the provision of certain improvements in concentration operations. More particularly, the invention contemplates the provision of certain improvements in flotation operations. A further object of the invention is to provide certain improvements in flotation methods or processes. Another object of the invention is to provide new and improved flotation reagents and methods of producing such reagents.

The invention is based on my discovery that dicarbonyl compounds having the following structural formula are effective flotation reagents which may be employed advantageously as mineral collecting agents in conjunction with frothing agents and conditioning agents in froth flotation operations:

$$X-C-Y-C-X$$
$$\underset{O}{\|} \quad \underset{O}{\|}$$

in which X is an organic dithio acid radical and Y is an organic radical.

In the preferred methods or processes of the invention, I employ dicarbonyl compounds comprising organic dithio acid radicals and dicarbonyl compounds in which the carbonyl groups are joined together by means of multivalent organic radicals. Dicarbonyl compounds comprising xanthate radicals and dithiophosphate radicals may be employed advantageously in methods or processes of the invention. Dicarbonyl compounds in which the carbonyl groups are joined together by means of glycol radicals such, for example, as O—C₂H₄—O and

O—C₂H₄—O—C₂H₄—O compounds such, for example as derivatives of ethylene glycol and diethylene glycol can be used with particular advantage in the methods or processes of the invention.

A dicarbonyl compound comprising a xanthate radical may be produced, for example, by reacting a salt or an acid comprising a xanthate radical with a dihaloformate to form a product having the following structural formula:

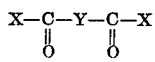

in which Y is a multivalent organic radical such, for example, as a glycol radical, and R' and R'' are organic radicals such, for example, as ethyl radicals.

A dicarbonyl compound comprising a dithiophosphate radical may be produced, for example, by reacting a salt or an acid comprising an organic dithiophosphate radical with a dihaloformate to form a product having the following structural formula:

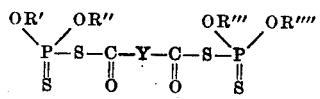

in which Y is a multivalent organic radical such, for example, as a glycol radical, and R', R'', R''' and R'''' are organic radicals such, for example, as ethyl radicals.

When substitution products of organic dithio acids containing organic radicals are employed, bis carbonyl dithio compounds containing corresponding organic radicals will be produced. Substitution products of acids and salts containing alkyl radicals or aryl radicals or both may be employed, and, in the above formula, R', R'', R''' and R'''' represent such radicals.

The use of di-substituted organic compounds comprising dithiophosphate radicals results in the production of tetra-substituted compounds. The use of di-substituted esters, for example, results in the production of tetra esters of bis carbonyl dithiophosphate compounds.

The use of xanthates results in the production of bis carbonyl xanthate compounds containing the organic radicals or groups present in the reagents employed.

In producing compounds suitable for use in flotation processes of the invention, substitution products of acids and salts containing alkyl radicals or aryl radicals or both may be employed.

Among the compounds found most suitable for use in flotation concentration processes are

Compound A

A reaction product of sodium ethyl xanthate and ethylene glycol chloroformate having the following structural formula:

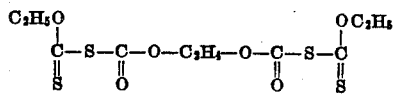

(ethylene glycol bis carbonyl ethyl xanthate)

Compound B

A reaction product of sodium ethyl xanthate and diethylene glycol chloroformate having the following structural formula:

$$\underset{S}{\overset{C_2H_5O}{C}}-S-\underset{O}{\overset{}{C}}-O-C_2H_4-O-C_2H_4-O-\underset{O}{\overset{}{C}}-S-\underset{S}{\overset{OC_2H_5}{C}}$$

(diethylene glycol bis carbonyl ethyl xanthate)

Compound C

A reaction product of sodium diethyl dithiophosphate and diethylene glycol chloroformate having the following structural formula:

$$\underset{S}{\overset{C_2H_5O\ \ OC_2H_5}{P}}-S-\underset{O}{\overset{}{C}}-O-C_2H_4-O-C_2H_4-O-\underset{O}{\overset{}{C}}-S-\underset{S}{\overset{C_2H_5O\ \ OC_2H_5}{P}}$$

(diethylene glycol bis carbonyl diethyl dithiophosphate)

Compound D

A reaction product of sodium butyl xanthate and diethylene glycol chloroformate having the following structural formula:

$$\underset{S}{\overset{C_4H_9O}{C}}-S-\underset{O}{\overset{}{C}}-O-C_2H_4-O-C_2H_4-O-\underset{O}{\overset{}{C}}-S-\underset{S}{\overset{OC_4H_9}{C}}$$

(diethylene glycol bis carbonyl butyl xanthate)

Compounds of the invention and their methods of production are described and claimed in my copending application Serial No. 679,566, filed June 26, 1946.

The following examples illustrate methods of preparing compounds in accordance with my invention suitable for use in the flotation methods or processes of my invention:

Example I

Preparation of the reaction product of sodium ethyl xanthate and diethylene glycol chloroformate $$2C_2H_5OCSNa + Cl-\underset{O}{\overset{}{C}}-O-C_2H_4-O-C_2H_4-O-\underset{O}{\overset{}{C}}-Cl =$$

$$C_2H_5O-\underset{S}{\overset{}{C}}-S-\underset{O}{\overset{}{C}}-O-C_2H_4-O-C_2H_4-O-\underset{O}{\overset{}{C}}-S-\underset{S}{\overset{}{C}}-OC_2H_5 + 2NaCl$$

300 grams of pure sodium ethyl xanthate·2H₂O (13% in excess of theory) were dissolved in 1 liter of water in a 2 liter flask provided with stirrer and thermometer. 170.4 grams of diethylene glycol chloroformate were added to this solution over a period of fifteen minutes. The temperature of the reaction mixture rose slowly to 30° C. The mixture was heated to 45° C. The heating was was then discontinued and the temperature slowly fell to that of the room. The total time of reaction was five hours.

The oily product was separated and the aqueous layer extracted with carbon bisulfide.

The oily product and the carbon bisulfide extracts were combined and the carbon bisulfide was distilled off en vacuo.

The product was a yellow oil. The yield was 241 grams which is 81.17% of the theoretical amount for the above equation.

Analysis: Sulfur calculated, 31.86%; sulfur found, 31.41%.

Example II

Preparation of the reaction product of sodium diethyl dithiophosphate and ethylene glycol chloroformate.

$$2(C_2H_5O)_2PSNa + Cl-\underset{O}{\overset{}{C}}-O-C_2H_4-O-\underset{O}{\overset{}{C}}-Cl =$$

$$(C_2H_5O)_2\underset{S}{\overset{}{P}}-S-\underset{O}{\overset{}{C}}-O-C_2H_4-O-\underset{O}{\overset{}{C}}-S-\underset{S}{\overset{}{P}}(OC_2H_5)_2 + 2NaCl$$

153.1 grams of 95% diethyl dithiophosphoric acid were dissolved in 500 ml. of dry acetone and converted to the sodium salt by neutralization with 44.7 grams of anhydrous sodium carbonate (108% of theory) which was added slowly. This mixture, contained in a 1 liter flask provided with a stirrer and thermometer, was stirred for fifteen minutes after the addition of the sodium carbonate to complete the neutralization. 73 grams of ethylene glycol chloroformate were then added in 20 minutes, the temperature was kept below 25° C. by means of a cooling bath, and the stirring was continued for two hours after the ethylene glycol chloroformate had been added.

The reaction mixture was diluted with water and the water insoluble oily reaction product was separated and dried by warming to 50° C. en vacuo.

191 grams of product were obtained which is a theoretical yield.

Analysis: Sulfur calculated, 26.36%; sulfur found, 26.35%.

Dicarbonyl compounds containing other organic radicals may be produced by the same procedure or by similar procedures when employing organic reagents containing such other organic radicals.

When employed as flotation reagents, dicarbonyl compounds may be pure or substantially pure or they may be mixed with other organic compounds in reaction products resulting from processes employed in their production. The pure compounds may be produced by employing pure reagents and carrying out the reactions at low temperatures. At relatively high temperatures, side reactions take place which result in the production of reaction mixtures containing dicarbonyl compounds and other organic compounds. The use of impure reagents in the production of the dicarbonyl compounds also results in the production of relatively impure or crude reaction mixtures. The yield of dicarbonyl compounds in any particular reaction will depend upon the purity of the reagents and the temperature employed. The purity of reagents and the temperatures employed will be governed by economic considerations.

The flotation reagents of the invention may be employed advantageously in neutral, alkaline and acid circuits, but they may be employed with particular advantage in alkaline circuits.

The flotation reagents of the invention may be employed advantageously in froth flotation operations designed for the concentration of both non-metallic minerals and metallic minerals and in froth flotation operations designed for the concentration of both oxidized ores and sulphide ores. The reagents can be employed with particular advantage in froth flotation operations designed for the concentration of sulphide ores.

The following examples illustrate the advantages of the reagents of the invention over reagents employed heretofore:

Example I

Miami copper sulphide ore products of the following compositions with respect to copper were ground in water to form three separate aqueous pulps which were subjected to separate froth flotation operations in the presence of the reagents indicated with the production of concentrate and tailing products of the analyses indicated:

|  | Test No. | | |
|---|---|---|---|
|  | 1 | 2 | 3 |
| Ore: Per cent Cu | .630 | .628 | .648 |
| Concentrates: Per cent Cu | 14.79 | 12.18 | 12.54 |
| Tails: Per cent Cu | .089 | .076 | .076 |

REAGENTS, POUNDS PER TON

| Lime | 4.0 | 4.0 | 4.0 |
|---|---|---|---|
| Pine oil | .045 | .045 | .045 |
| Standard reagent | .01 | | |
| Compound A | | .01 | |
| Compound B | | | .01 |

Example II

Utah Copper Company copper sulphide ore products of the following compositions with respect to copper were ground in water to form two separate aqueous pulps which were subjected to separate froth flotation operations in the presence of the reagents indicated with the production of concentrate and tailing products of the analyses indicated:

|  | Test No. | |
|---|---|---|
|  | 1 | 2 |
| Ore: Per cent Cu | 1.135 | 1.135 |
| Concentrates: Per cent Cu | 25.80 | 26.65 |
| Tails: Per cent Cu | .080 | .075 |

REAGENTS, POUNDS PER TON

| Lime | 3.25 | 3.25 |
|---|---|---|
| Cyanide | .015 | .015 |
| Cresylic Acid frother | .33 | .33 |
| Standard reagent | .034 | |
| Compound B | | .04 |

Example III

Morenci copper sulphide ore products of the following compositions with respect to copper were ground in water to form two separate aqueous pulps which were subjected to separate froth flotation operations in the presence of the reagents indicated with the production of concentrate and tailing products of the analyses indicated:

|  | Test No. | |
|---|---|---|
|  | 1 | 2 |
| Ore: Per cent Cu | 1.02 | 1.03 |
| Concentrates: | | |
| Per cent Cu | 14.15 | 13.35 |
| Per cent Fe | 23.8 | 20.8 |
| Cu/Fe ratio | .59 | .64 |
| Tailings: Per cent Cu | .12 | .12 |

REAGENTS, POUNDS PER TON

| Lime | 5.5 | 5.5 |
|---|---|---|
| Cresylic Acid | .16 | .16 |
| Standard reagent | .037 | |
| Compound C | | .028 |

The two tests directly above illustrate an improvement in iron rejection with compound C.

In the above examples, the standard reagents referred to were the known mineral collecting agents, xanthogen formates, accepted at the times of the tests as being most effective in treating the ores tested, and the amounts indicated were the amounts considered to be most suitable.

I claim:

1. The method of concentrating sulphide ore which comprises subjecting the ore in the form of a pulp to a froth flotation operation in the presence of a compound having the structural formula:

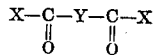

in which X is an organic dithio acid radical of the group consisting of alkyl xanthate radicals and alkyl dithiophosphate radicals and Y is an organic radical of the group consisting of radicals having the following structural formulas:

$$O-C_2H_4-O$$

and $$O-C_2H_4-O-C_2H_4-O$$

2. The method of concentrating sulphide ore which comprises subjecting the ore in the form of a pulp to a froth flotation operation in the presence of a compound having the structural formula:

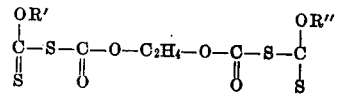

in which R' and R'' are alkyl radicals.

3. The method of concentrating sulphide ore which comprises subjecting the ore in the form of a pulp to a froth flotation operation in the presence of a compound having the structural formula:

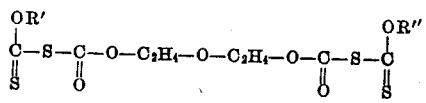

in which R' and R'' are alkyl radicals.

4. The method of concentrating sulphide ore which comprises subjecting the ore in the form of a pulp to a froth flotation operation in the presence of a compound having the structural formula:

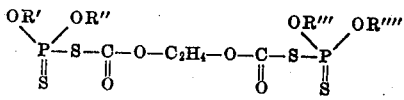

in which R', R'', R''' and R'''' are alkyl radicals.

5. The method of concentrating sulphide ore which comprises subjecting the ore in the form of a pulp to a froth flotation operation in the presence of a compound having the structural formula:

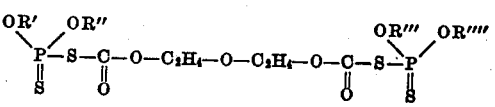

in which R', R'', R''' and R'''' are alkyl radicals.

ARTHUR H. FISCHER.

REFERENCES CITED

The following references are of record in the file of this patent:

UNITED STATES PATENTS

| Number | Name | Date |
|---|---|---|
| 2,011,176 | Keller | Aug. 13, 1935 |
| 2,177,985 | Harris | Oct. 31, 1939 |
| 2,178,139 | Epstein | Oct. 31, 1939 |
| 2,198,915 | MacAfee | Apr. 30, 1940 |
| 2,321,186 | Christmann | June 8, 1943 |

Disclaimer 2,501,269.—*Arthur F. Fischer*, New York, N. Y. FROTH FLOTATION OF SULFIDE ORES. Patent dated Mar. 21, 1950. Disclaimer filed Dec. 24, 1951, by the inventor, the assignee, *Minerec Corporation*, assenting.

Hereby enters this disclaimer to claim 3 of said patent and to as much of claim 1 as is in excess of the following:

The method of concentrating sulphide ore which comprises subjecting the ore in the form of a pulp to a froth flotation operation in the presence of a compound having the structural formula $$\text{X}-\underset{\underset{\text{O}}{\|}}{\text{C}}-\text{Y}-\underset{\underset{\text{O}}{\|}}{\text{C}}-\text{X}$$

in which X is an organic dithio acid radical of the group consisting of alkyl xanthate radicals and alkyl dithiophosphate radicals and Y is the organic radical $$\text{O}-\text{C}_2\text{H}_4-\text{O}$$

and in which X is an alkyl dithiophosphate radical and Y is the organic radical $$\text{O}-\text{C}_2\text{H}_4-\text{O}-\text{C}_2\text{H}_4-\text{O}$$

[*Official Gazette January 22, 1952.*]